US012785343B2

(12) United States Patent
Brower

(10) Patent No.: US 12,785,343 B2
(45) Date of Patent: Nov. 3, 2026

(54) ELECTRICAL RECEPTACLE WITH GROUND FAULT CIRCUIT INTERRUPTER AND POWER CONVERSION DEVICE FOR LOW-VOLTAGE INTERFACE

(71) Applicant: Hubbell Incorporated, Shelton, CT (US)

(72) Inventor: John E. Brower, Fairfield, CT (US)

(73) Assignee: Hubbell Incorporated, Shelton, CT (US)

( * ) Notice: Subject to any disclaimer, the term of this patent is extended or adjusted under 35 U.S.C. 154(b) by 378 days.

(21) Appl. No.: 18/545,152

(22) Filed: Dec. 19, 2023

(65) Prior Publication Data

US 2024/0222918 A1 Jul. 4, 2024

Related U.S. Application Data

(60) Provisional application No. 63/435,671, filed on Dec. 28, 2022.

(51) Int. Cl.

| | |
|---|---|
| ***H01R 27/02*** | (2006.01) |
| ***H01R 12/52*** | (2011.01) |
| ***H01R 13/713*** | (2006.01) |
| ***H01R 25/00*** | (2006.01) |

(52) U.S. Cl.

CPC ........... *H01R 27/02* (2013.01); *H01R 12/523* (2013.01); *H01R 13/7135* (2013.01); *H01R 25/006* (2013.01)

(58) Field of Classification Search

CPC .. H01R 27/02; H01R 12/523; H01R 13/7135; H01R 25/006; H01R 12/585; H01R 13/6658; H01R 13/6675; H01H 83/02

USPC ........................................................... 361/42

See application file for complete search history.

(56) References Cited

U.S. PATENT DOCUMENTS

| | | | | |
|---|---|---|---|---|
| 2012/0292991 | A1* | 11/2012 | Dodal | H02H 3/16 307/11 |
| 2017/0324195 | A1* | 11/2017 | Eriksen | H01R 24/78 |
| 2018/0315557 | A1 | 11/2018 | Aromin | |
| 2019/0097364 | A1* | 3/2019 | Mortun | H01R 13/6683 |
| 2021/0135452 | A1* | 5/2021 | Roberts | H02H 3/335 |
| 2022/0337049 | A1* | 10/2022 | Brower | H02H 3/16 |
| 2022/0399729 | A1 | 12/2022 | Gellis et al. | |

OTHER PUBLICATIONS

International Search Report and Written Opinion issued on Mar. 22, 2024, by the International Searching Authority in corresponding International Patent Application No. PCT/US2023/084815. (16 pages).

* cited by examiner

*Primary Examiner* — Sreeya Sreevatsa
(74) *Attorney, Agent, or Firm* — Robinson + Cole LLP

(57) ABSTRACT

An electrical outlet includes a housing having a faceplate with a first opening in communication with a high-voltage interface and a second opening in communication with a low-voltage interface. A power supply circuit board having a power conversion circuit is positioned in the housing. A protection circuit board having a circuit interrupting device is positioned in the housing. A low-voltage circuit board includes the low-voltage interface. A compliant pin electrically connects the power conversion circuit and the low-voltage interface. The protection circuit board is positioned between the power supply circuit board and the low-voltage circuit board.

20 Claims, 8 Drawing Sheets

ELECTRICAL RECEPTACLE WITH GROUND FAULT CIRCUIT INTERRUPTER AND POWER CONVERSION DEVICE FOR LOW-VOLTAGE INTERFACE

RELATED APPLICATION(S)

This application is based on Provisional Application Ser. No. 63/435,671, filed Dec. 28, 2023, the disclosure of which is incorporated herein by reference in its entirety and to which priority is claimed.

FIELD

Various implementations relate to electrical receptacles, particularly electrical receptacles with circuit interrupting devices.

BACKGROUND

Many electrical outlets come with built-in circuiting interrupting devices. Circuit interrupting devices are designed to trip in response to the detection of a fault condition at an AC load. One example is a ground fault circuit interrupter (GFCI) that can be integrated into a standard three-prong outlet. A ground fault occurs when electricity flows through an unintended path and is not returned through the outlet. The fault can result when a person comes into contact with the hot side of the AC load and an earth ground, a situation which can result in serious injury. A ground fault circuit interrupter (GFCI) detects this condition by using a sense transformer to detect an imbalance between the currents flowing in the line and neutral conductors of the AC supply, as will occur when some of the current on the load hot side is being diverted to ground. When such an imbalance is detected, a relay or circuit breaker within the GFCI device is immediately tripped to an open condition, thereby removing all power from the load.

GFCI outlets are required in certain locations by local and national codes, including the National Electrical Code (NEC). They can be required or recommended in areas of the home where there is an increased risk of electrical shock such as in wet areas like kitchens and bathrooms. While these locations have typically utilized standard three prong receptacles, there is a growing need for introducing low voltage DC receptacles in electrical outlets to accommodate charging of portable electronic devices.

These devices typically utilize a universal serial bus (USB) charging interface which can provide a power and data connection through an outlet. Different types of USB interfaces can be used, including USB-A and USB-C receptacles. USB charging devices typical provide a voltage output of approximately 5V and can provide power outputs in a variety of wattages, for example between 2.5 W to 100 W.

SUMMARY

In certain configurations, an electrical outlet includes a housing having a faceplate with a first opening in communication with a high-voltage interface and a second opening in communication with a low-voltage interface. A power supply circuit board having a power conversion circuit is positioned in the housing. A protection circuit board having a circuit interrupting device is positioned in the housing. A low-voltage circuit board includes the low-voltage interface. A compliant pin electrically connects the power conversion circuit and the low-voltage interface. The protection circuit board is positioned between the power supply circuit board and the low-voltage circuit board.

In certain configurations, an electrical outlet includes a housing having a faceplate with a first opening in communication with a high-voltage interface and a second opening in communication with a low-voltage interface. A protection circuit board includes a circuit interrupting device. A high-voltage input is electrically connected to the protection circuit board. A power supply circuit board is electrically connected to the high-voltage input and configured to convert a high-voltage source to a low-voltage power supply. A low-voltage circuit board is in communication with the low-voltage interface. The low-voltage circuit board receives the low-voltage power supply from the power supply circuit board. A plurality of compliant pins connect the low-voltage circuit board and the power supply circuit board.

In certain implementations, a method for assembling an electrical receptacle includes stacking first, second and third boards such that the first board is arranged between the second and third board. The first board includes a GFCI circuit, the second board includes a low-voltage interface, and the third board includes a power conversion device. The stacking includes connecting at least one compliant pin between the second and third boards which establishes an electrical connection between the power conversion device and the low-voltage interface to power the low-voltage interface.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
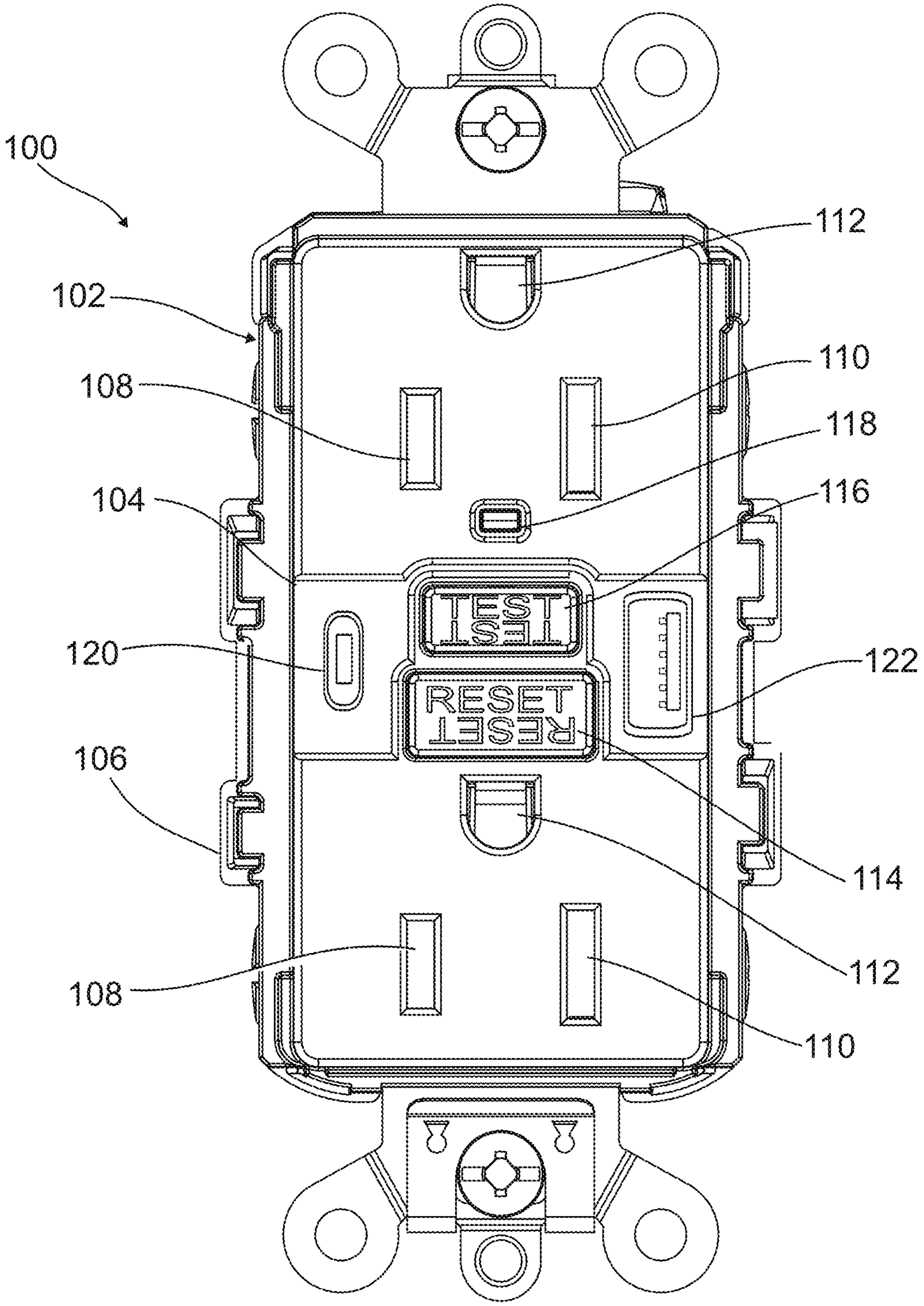
FIG. 1 is a front view of an exemplary electrical outlet.

Various implementations are directed to an electrical outlet which utilizes one or more compliant pins to electrically and mechanically connect internal circuit boards. One or more circuit boards can be contained in an outlet housing and provide various functionality to the outlet. These circuit boards can utilize compliant pins so that a mechanical and electrical connection can be made between the boards, simplifying the assembly of the boards and minimizing the space required for the internal components.

In certain configurations, an outlet can include a housing containing a plurality of circuit boards. A first circuit board that includes a power conversion circuit configured to convert an AC input power supply to a low-voltage DC output. A second circuit board can include a circuit interrupting device, such as a GFCI or an arc fault circuit interrupter (AFCI). A third circuit board can include a low-voltage interface, such as a USB interface. The circuit interrupting circuit board can be positioned between the power conversion circuit and the low-voltage interface circuit.

One or more compliant pins can be used to connect the low-voltage interface with the power conversion circuit to provide a mechanical and electrical connection between the two circuits. The compliant pin connection can include a pin extending into an opening. In certain configurations, the compliant pin can have a needle eye structure which is compressed as it enters and opening to form an interface fit which helps retain the connection between the pin and the opening. The needle eye structure can pass through the opening or be retained in the opening. The opening can be plated to provide an electrical connection. Other configurations, including different sizes and shapes of compliant pins and opening, can also be used.

In certain configurations, one or more compliant pins can extend through the second circuit board to directly connect the first and third circuit boards. The compliant pins can include one or more compliant pins that extend from the first circuit board, through the second circuit board, and into openings in the third circuit board. In other configurations, one or more compliant pins extend from the third circuit board, through the second circuit board, and into openings in the first circuit board. In other configurations, a combination of compliant pins in the first circuit board and in the third circuit board mating with openings in the first circuit board and the third circuit board can also be used.

In still other configurations, compliant pins in the first circuit board and compliant pins in the third circuit board are mated with openings in the second circuit board to provide a mechanical and electrical connection. The openings receiving the pins from the first and third circuit boards can be aligned or staggered.

Typical connections in outlets require running wire conductors between connection points and can also include the use of solder at the connection points. The circuit boards also need to be spaced from one another and held in place mechanically using structure formed into the housing and/or by adding internal structural components such as offset bossed. This type of connection can be costly to manufacture, and labor intensive to assembly. It can also require more space in the outlet housing to accommodate the wires and solder.

The use of compliant pins can provide a number of advantages over the traditional connections. Compliant pins can reduce the number of parts and features needed to be formed during assembly. The use of the compliant pins can also allow the circuit boards to be easily press-fit together which reduces the amount of time needed to assembly the device. Elimination of wire and solder connection also reduces the space requirements, enabling the use of a thinner housing. Because space in electrical boxes is limited, and the use of GFCI circuits already requires a greater depth than a standard outlet, space savings are especially important to allow for housing and connection of power supply conductors.

Various configurations for an outlet using compliant pins to electrically and mechanically connect different circuit boards can be used, with examples of some configurations being shown in the drawings and described below.

FIG. 1 shows an outlet 100 with a housing 102 having a front cover 104 and a rear cover 106. The front cover 104 and the rear cover 106 can be mated using one or more snap-fit connectors. The front cover 104 includes a pair a duplex outlet faces with a high-voltage interface having a line, or hot, opening 108 providing communication with a line contact, a neutral opening 110 providing communication with a neutral contact, and a ground opening 112 providing communication with a ground contact. The internal line, neutral, and ground contacts are positioned inside of the housing 102. The line and neutral contacts can be connected to a mains power supply, for example via conductors connected to one or more terminals on the side or rear of the housing 102.

The front cover 104 further has an opening accommodating a RESET button 114 and an adjacent opening accommodating a TEST button 116. The line opening 108, neutral opening 110, and ground opening 112 and the RESET button 114 and the TEST button 116 can be connected to a circuit interrupting circuit board that is positioned in the housing 102. The circuit interrupting circuit board can have various components configured to detect a fault condition. If a fault condition is detected, the circuit interrupter breaks the electrical connection between the line and neutral terminals and the mains power supply. The reset button 114 is used to reset this connection and the test button 116 can be used to test the operation of the circuit interrupter.

An additional opening provides communication for an indicator 118. In some implementations the indicator 118 is a multi-color light-emitting diode (LED). The LED can provide operating information for one or more internal components of the outlet 100, for example the circuit interrupting device. In certain configurations, the indicator 118 can be used as a night light or it can include or be a sensor such as a photocell to control one or more components of the outlet 100.

One or more low-voltage interfaces are provided on the front cover 104. The illustrated embodiment shows a first low-voltage interface having a USB-C socket 120 and a second low-voltage interface having a USB-A socket 122. The USB-C socket 120 and the USB-A socket 122 can be connected to a low-voltage circuit board positioned in the housing 102. The low-voltage circuit board can be electrically isolated from the circuit interrupting circuit board.

Figure 2:
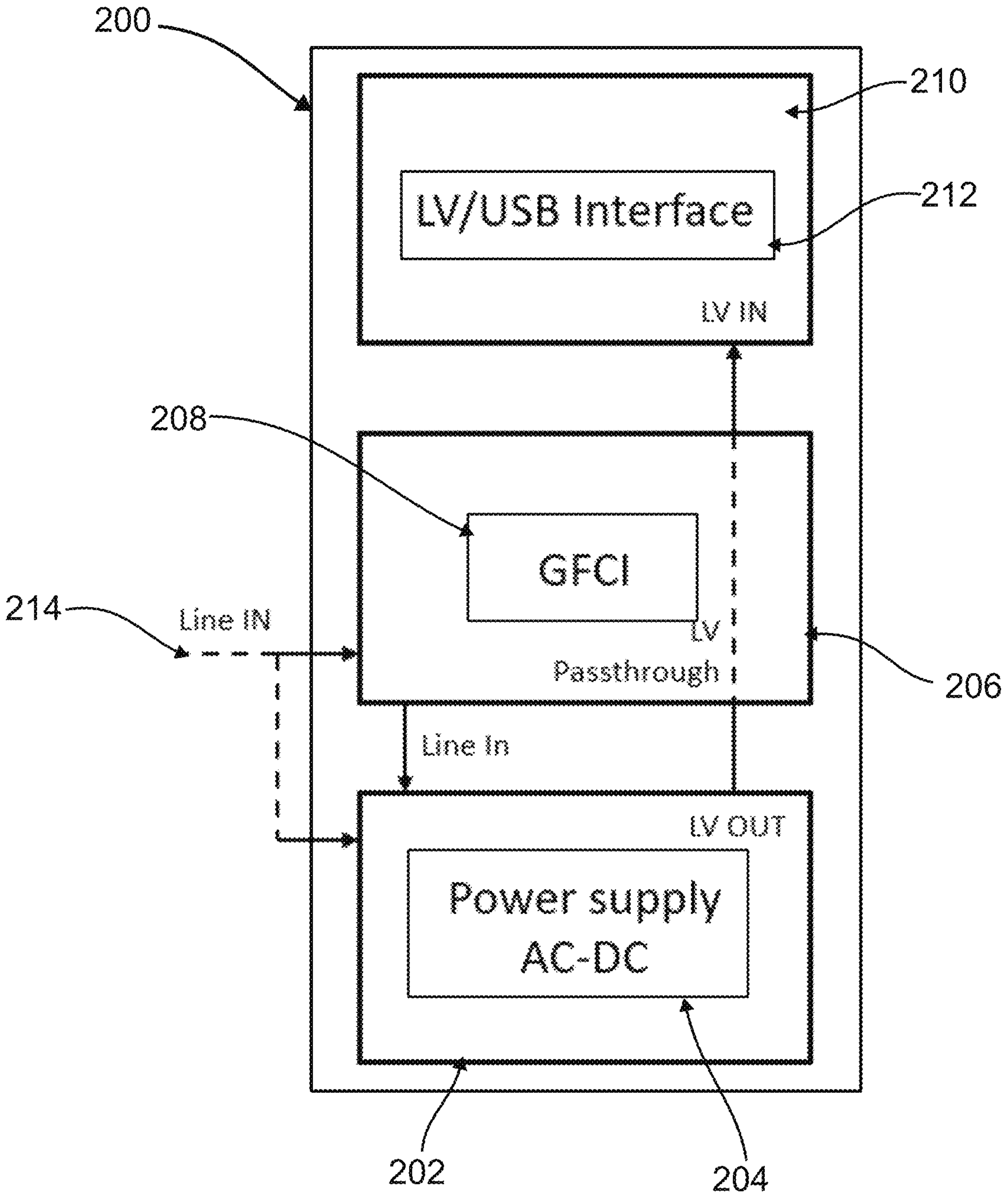
FIG. 2 is a block diagram circuit schematic of an exemplary outlet configuration.

FIG. 2 shows a block diagram schematic of a configuration of the internal circuit board layout for an outlet 200. The outlet includes a power supply circuit board 202 having a power conversion circuit 204. The power conversion circuit 204 is configured to convert the input AC voltage to a low-voltage DC output to be supplied to the low-voltage interface 212.

The power conversion circuit 204 can provide power at a low voltage to the low-voltage interface 212, such as, but not limited to, voltage within the range 3V-24V, or as low as 1.8V or 1V, and/or as high as 48V or 54V, and/or any voltage values in between. The power conversion circuit 204 can provide any desired power to the low-voltage interface 212, such as, but not limited to, less than 2.5 W, 2.5 W, 60 W, 100 W, or more, or any value in-between. The power conversion circuit 204 can also be used to power one or more additional, auxiliary low voltage interfaces.

The power conversion circuit 204 can include a transformer for transforming the input AC voltage to a lower AC voltage, a rectifier for converting the AC voltage to a DC voltage, a filter for smoothing the DC voltage, and a voltage regulator for maintaining a consistent level of DC voltage. Various electrical components including resistors, capacitors, inductors, switches, and microcontrollers can be used in different topologies to obtain the required functionality. For example, the transformer can include a planar transformer or a wire wound transformer. The rectifier can include an input bridge rectifier. The filter can include one or more active compensators, capacitors, switching devices, or any combination thereof. The switching devices can include silicon switching devices or GaN and/or SiC switching devices. The voltage regulatory can include an integrated circuit that regulates the output voltage to meet the USB specifications. The integrated circuit can include overcurrent protection and a thermal protection function.

A protection circuit board 206 includes a circuit interrupting device 208. The circuit interrupting device 208 can be a GFCI (as illustrated) or an AFCI. The circuit interrupting device 208 can include a microcontroller having a processor and integrated memory and is configured to detect the occurrence of a trip even in the circuit, such as a ground fault or grounded neutral conditions and control the device to trip and create an open-circuit condition. Various configurations of circuit interrupting devices, including components and overall functions are known in the art and can be incorporated in to the outlet 200.

A low-voltage circuit board 210 includes a low-voltage interface 212. The low-voltage interface 212 can include a receptacle or port for low-voltage charging. The receptacle can include one or more universal serial bus (USB) interfaces, a high-definition multimedia interface (HDMI), or any other low-voltage interface known in the art. The USB interfaces can include any combination of USB ports, including USB-A, USB-B, USB-C, mini USB, and micro USB ports.

The outlet 200 is connected to a main power supply 214. The main power AC supply 214 can include line voltage that is connected to the protection circuit board 206 and through the protection circuit board 206 to the power supply circuit board 202. In some configurations, the line voltage input can bypass the protection circuit board 206 and be provided to the power supply circuit 204.

The connection from the power supply circuit board 202 to the low-voltage circuit board 210 is internal to the footprint of the circuit boards. It can pass through the protection board 206 or be made via the protection board 206. This configuration results in a significantly lower-profiled electrical box, which can free additional and valuable space for wire management inside a respective electrical box.

Figure 3:
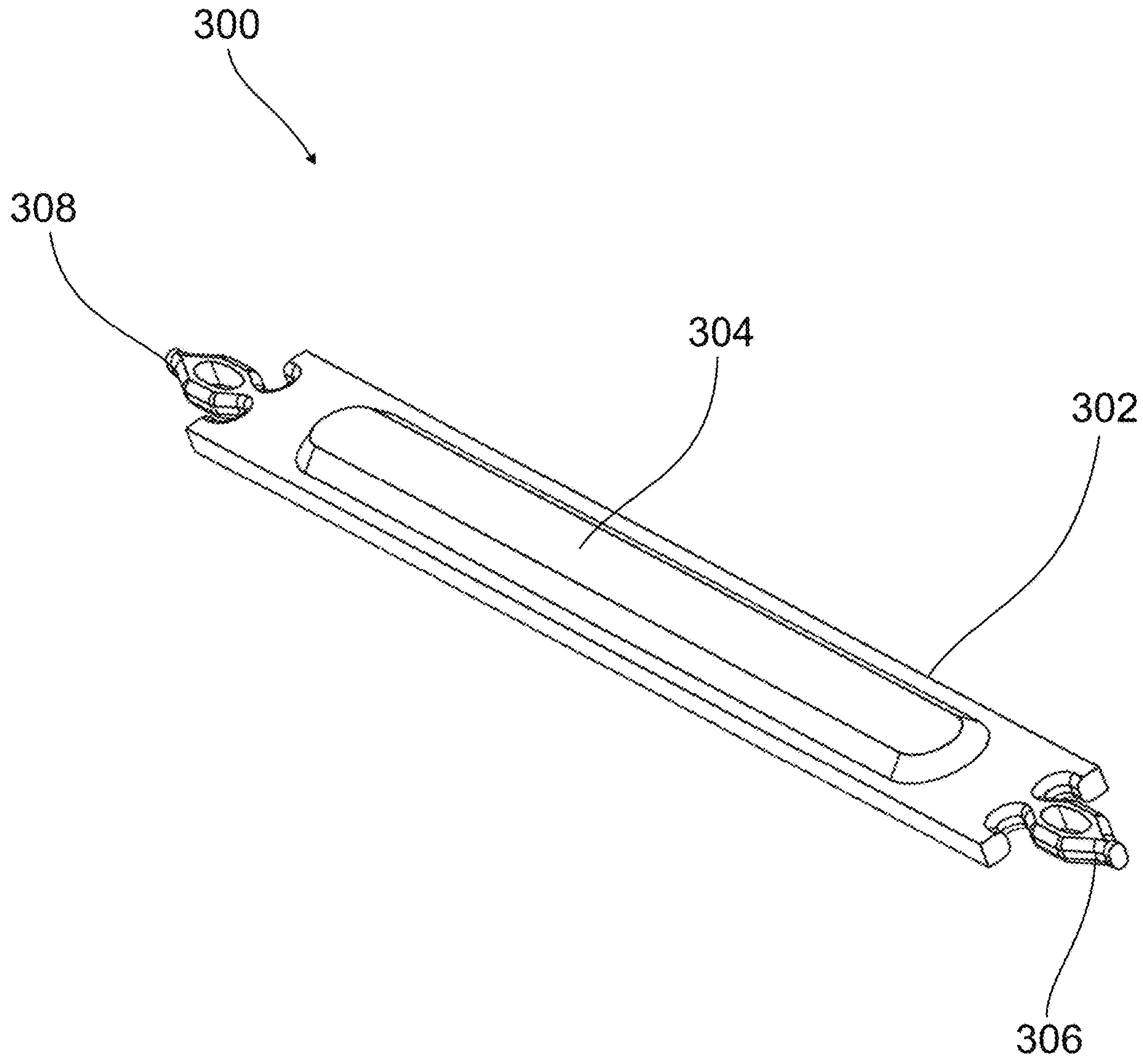
FIG. 3 is a perspective view of an exemplary compliant pin.

In various implementations, the connection between the power supply circuit board 202 and the low voltage circuit board 210 is accomplished using one or more compliant pins. Compliant pins can help secure a mechanical and electrical connection between the different components and provide flexibility during assembly. FIG. 3 shows an exemplary configuration of a compliant pin 300. The compliant pin 300 includes a body 302 having a raised central rib 304. A first head 306 extends from a first end of the body 302 and a second head 308 extends from a second end of the body. The first head 306 and the second head 308 have a needle-eye configuration which has an eyelet or loop defined by two arms extending around an opening which join and taper to a point. The eyelet can have resilience that allows for compression when inserted into a receiving opening.

A plurality of pins 300 can be used in each board and the individual compliant pins 300 are configured to transfer power and/or serial communication signals between the circuit boards. For example, in some embodiments, a first compliant pin and a second compliant pin are configured as power pins used for transferring power between circuit boards. Further compliant pins, for example a third, fourth, and fifth compliant pin can be configured as serial communication pins used for transferring serial data signals between the circuit boards. Any number of compliant pins may be used with each circuit board.

Figure 4:
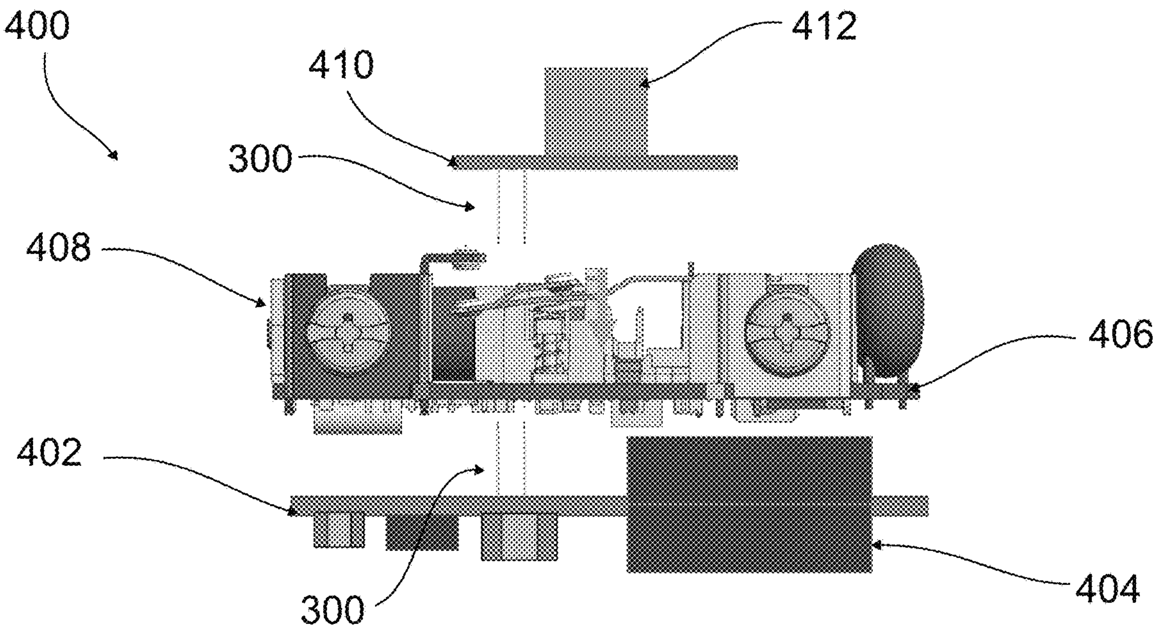
FIG. 4 is an assembly view of components of an electrical outlet with a planar transformer.

FIG. 4 shows a partially exploded view of some internal components of an outlet 400. The components 400 include a power supply circuit board 402 having a power conversion circuit 404, a protection board 406 having a GFCI assembly 408, and a low-voltage circuit board 410 having a USB interface 412. The power conversion circuit 404 is a planar-type power conversion device.

A pair of compliant pins 300 can be connected to each of the power supply circuit board 402 and the low-voltage circuit board 410. The pins 300 extend from the respective boards 402, 410 toward the protection circuit board 406. The first end of the pins 300 can be placed in openings in the respective boards 402, 410 with the second ends configured to mate with openings in the protection circuit board 406. The openings can be plated so that an electrical and mechanical connection can be formed between the respective boards. In certain configurations, an electrical connection is formed between the power conversion circuit 404 and the low-voltage interface 412, while the GFCI assembly 408 is electrically isolated from the low voltage interface 412.

Figure 5:
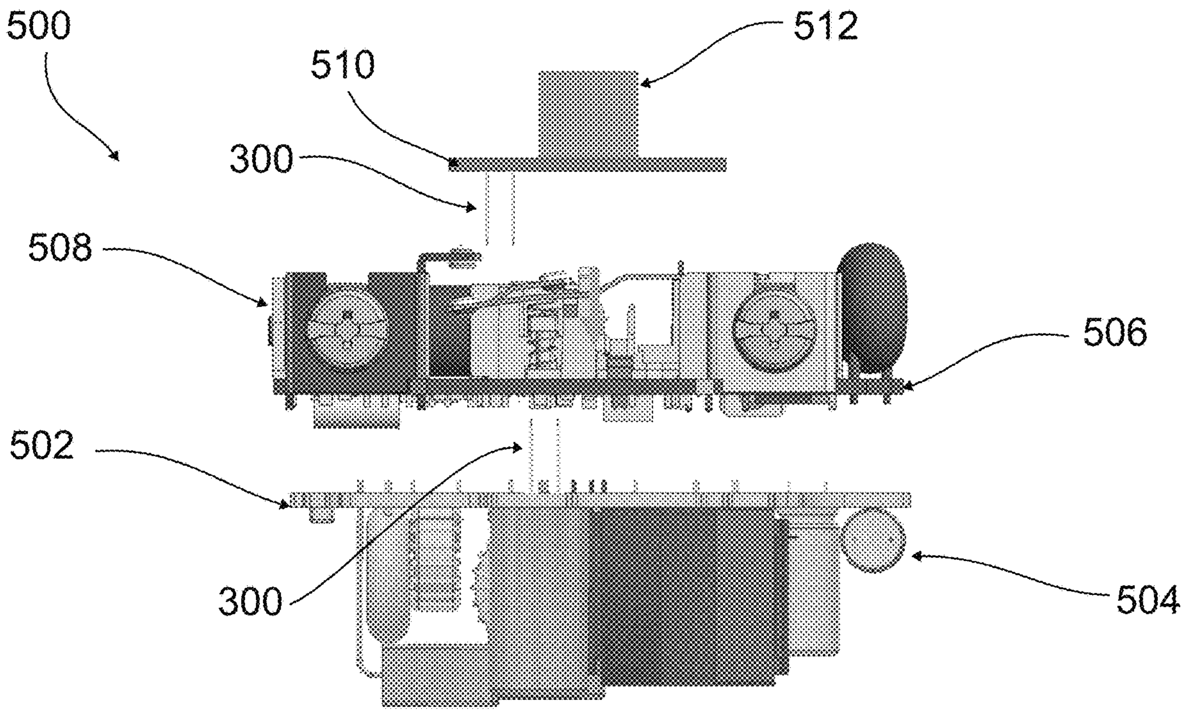
FIG. 5 is an assembly view of components of an electrical outlet with a wire wound transformer.

FIG. 5 shows a partially exploded view of some internal components of an outlet 500. The components 500 include a power supply circuit board 502 having a power conversion circuit 504, a protection board 506 having a GFCI assembly 508, and a low-voltage circuit board 510 having a USB interface 512. The power conversion circuit 504 is a wire-wound transformer-type power conversion device.

A pair of compliant pins 300 can be connected to each of the power supply circuit board 502 and the low-voltage circuit board 510. The pins 300 extend from the respective boards 502, 510 toward the protection circuit board 506. The first end of the pins 300 can be placed in openings in the respective boards 502, 510 with the second ends configured to mate with openings in the protection circuit board 506. The openings can be plated so that an electrical and mechanical connection can be formed between the respective boards. In certain configurations, an electrical connection is formed between the power conversion circuit 504 and the low-voltage interface 512, while the GFCI assembly 508 is electrically isolated from the low voltage interface 512.

Figure 6:
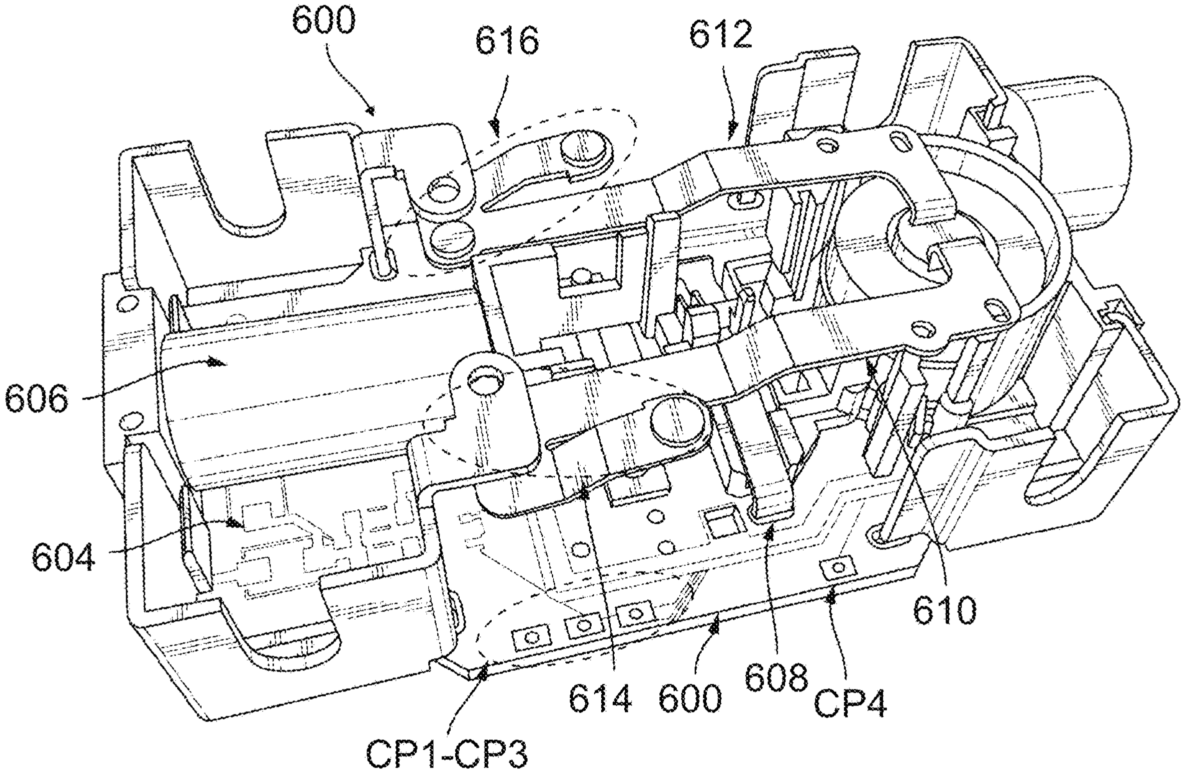
FIG. 6 is a perspective view of a protection circuit board with components of a ground fault circuit interrupter.

FIG. 6 shows an exemplary configuration of components of a protection circuit board 600 and a GFCI 602. The protection circuit board 600 includes a top surface 604 that provides support for an interrupting solenoid 606 and a low voltage switch 608 which is operable to trigger a ground fault self-test. The top surface 604 further supports cantilevered line and neutral line contact arms 220, 225 and line and neutral load contact arms 230, 235 (FIG. 6). The respective distal ends of the line contact arms 220, 225 support the line and neutral contacts line 610, 612. The respective distal ends of the load contact arms support the line and neutral load contacts (not shown). The resiliency of the cantilevered line contact arms 610, 612 biases the line contacts 614, 616 away, or separated, from the load contacts. The load contact arms extend from a movable contact carriage which is constructed from an insulating material.

The protection circuit board 602 includes one or more compliant pin openings $CP_1$-$CP_4$. The openings $CP_1$-$CP_4$ are configured to receive a compliant pin 300. In certain configurations the openings are configured to engage the received pins, and in other configurations the openings can act as pass-through openings to permit the passage of a compliant pin 300 to another circuit board. The compliant pins can make a physical and electrical connection with another circuit board, such as a love-voltage circuit board and a power supply circuit board. The compliant pins can be configured to transmit power and data between the circuit boards.

Figure 7:
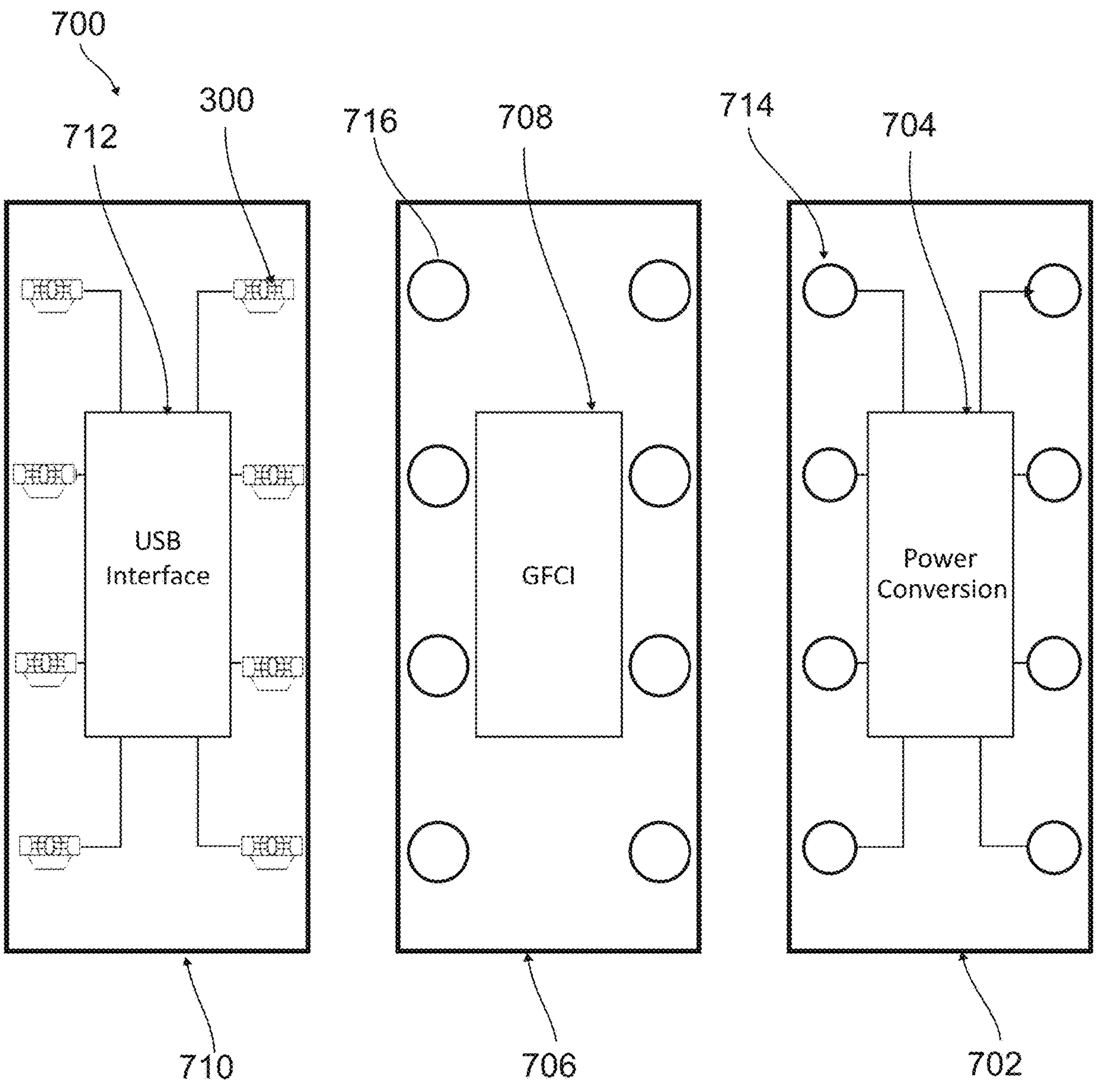
FIG. 7 is a schematic view of an exemplary assembly of circuit boards.

FIG. 7 shows a schematic of an exemplary configuration of circuit boards 700 that utilize a pass-through topology of complaint pins 300. The circuit boards 700 include a power supply circuit board 702 with a power conversion circuit 704, a protection circuit board 706 with a GFCI 708, and a low-voltage circuit board 710 with a USB interface 712.

The power supply circuit board 702 includes a plurality of openings 714 configured as compliant pin ports. The protection circuit board 706 includes a plurality of pass-through openings 716. The low-voltage circuit board 710 includes a plurality of compliant pins 300.

The pin ports 714 can be openings formed in the circuit board 702 that are plated with a conductive material. The ports 714 are configured to receive a portion of a compliant pin 300 in an interference fit. For example, the second ends of the compliant pins 300 can be pressed into the ports 714 so that the pins 300 will compress into the need-eye socket as they engage the ports 714. The first end of the pins can be similarly engaged in ports in the low-voltage circuit board. The body of the pins 300 will extend through the pass-through openings 716 in the protection board 706. This pass-through configuration can allow for engage of the compliant pins 300 with the pass-through openings 716 so that a mechanical interface is achieved if desired. An electrical interface can also be achieved in this fashion if desired. In some configurations however, the tolerance of the pass-through opening 716 can accommodate no engagement of the compliant pins 300. The pass-through openings 716 are meant to show that the body of the compliant pins 300 can extend through the protection circuit board 706 with the heads of the compliant pins 300 seated in the low-voltage circuit board 710 and the power supply circuit board 702. Although shown with the free ends in the low-voltage circuit board 710, the pins 300 can be initially placed in the power supply circuit board 702 and connected to the low-voltage circuit board during assembly.

Figure 8:
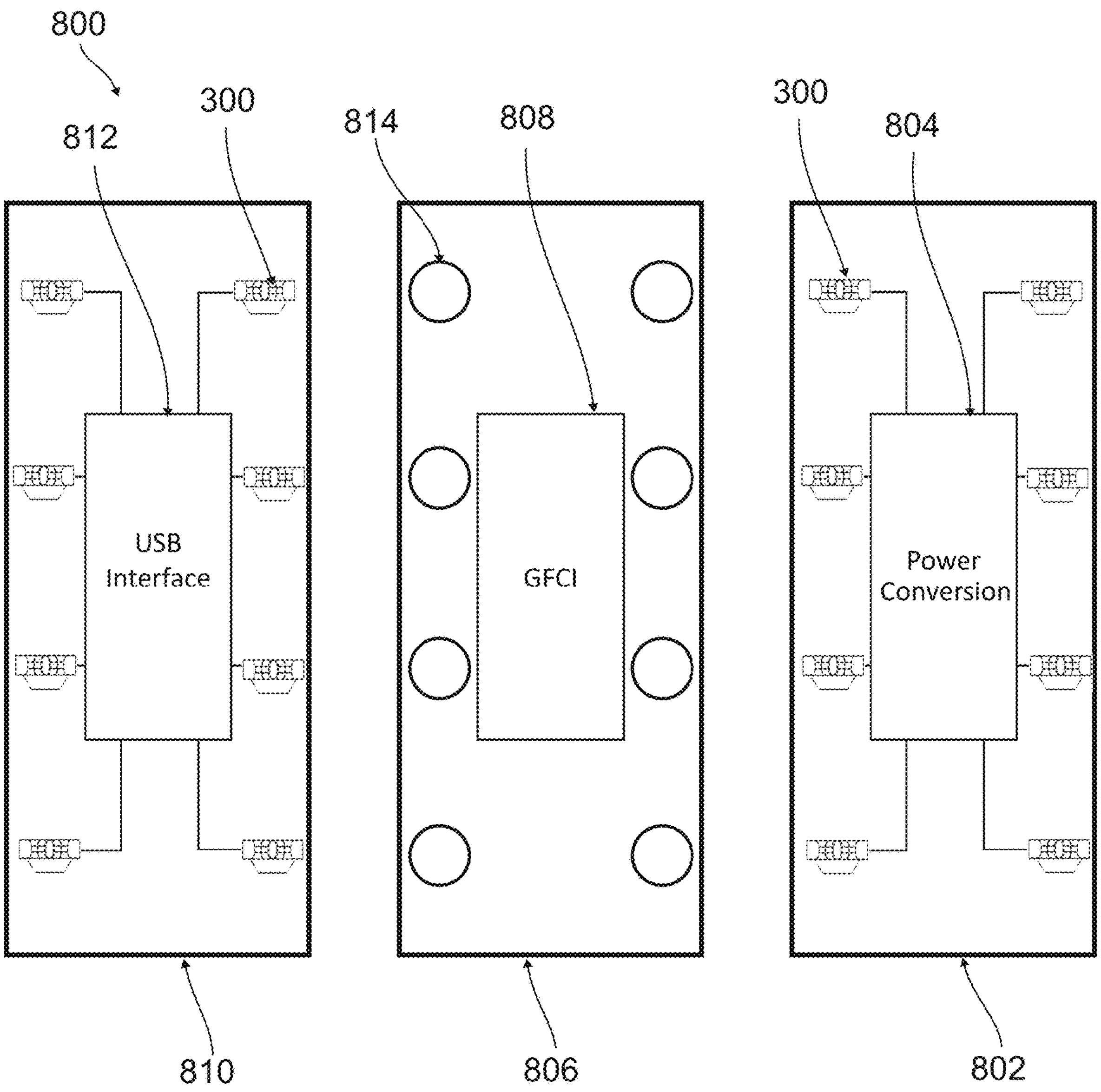
FIG. 8 is a schematic view of an exemplary assembly of circuit boards.

FIG. 8 shows a schematic of an exemplary configuration of circuit boards 800 that utilize a topology of two sets of complaint pins 300. The circuit boards 800 include a power supply circuit board 802 with a power conversion circuit 804, a protection circuit board 806 with a GFCI 808, and a low-voltage circuit board 810 with a USB interface 812.

The protection circuit board 806 includes a plurality of openings 814 configured as compliant pin ports. The low-voltage circuit board 810 and the power supply circuit board 802 each include a plurality of compliant pins 300. The protection circuit board 806 can include ports 814 on both side of the board so that the first side of the protection circuit board 806 receives pins form the low-voltage circuit board 810 and the second side of the protection circuit board 806 receives pins from the power supply circuit board 802. The ports 814 on the first and second sides of the protection circuit board 806 can be aligned or staggered as desired. The compliant pins 300 can form a mechanical and electrical connection between the boards 802, 806, 810.

Figure 9:
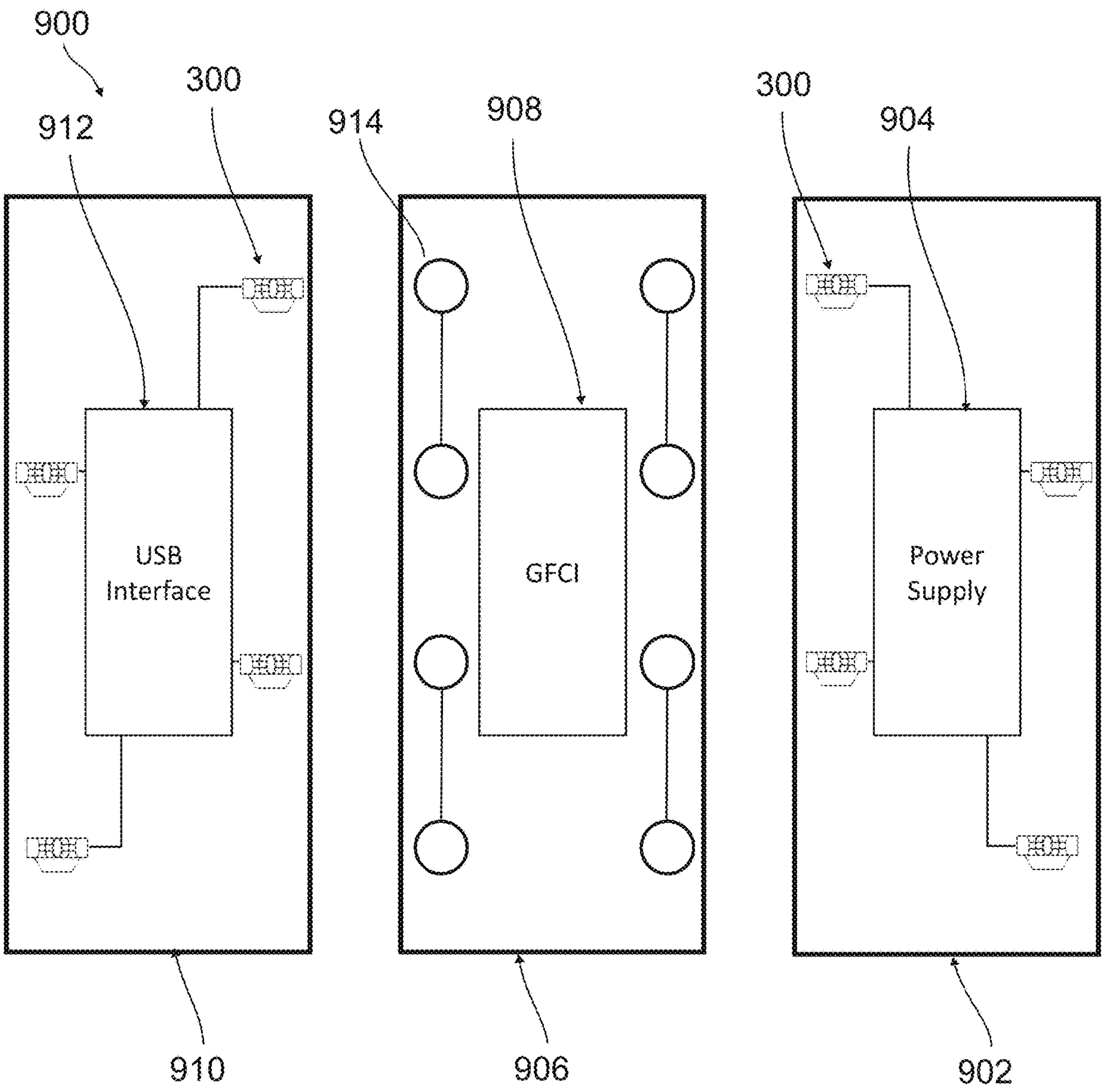
FIG. 9 is a schematic view of an exemplary assembly of circuit boards.

FIG. 9 shows a schematic of an exemplary configuration of circuit boards 900 that utilize a topology of two sets of complaint pins 300. The circuit boards 900 include a power supply circuit board 902 with a power conversion circuit 904, a protection circuit board 906 with a GFCI 908, and a low-voltage circuit board 910 with a USB interface 912.

The protection circuit board 906 includes a plurality of openings 914 configured as compliant pin ports. The low-voltage circuit board 910 and the power supply circuit board 902 each include a plurality of compliant pins 300. The protection circuit board 906 can include ports 914 on both side of the board so that the first side of the protection circuit board 906 receives pins form the low-voltage circuit board 910 and the second side of the protection circuit board 906 receives pins from the power supply circuit board 902. The ports 914 on the first and second sides of the protection circuit board 906 are staggered so that a first set of the ports 914 receives compliant pins 300 from the power supply board 902 and a second set of ports 915 receive complaint pins from the low-voltage circuit board 910. The compliant pins 300 can form a mechanical and electrical connection between the boards 902, 906, 910.

Any number of boards can be stacked using the above-described mechanical and electrical connections, by varying the length and/or number of compliant pins 300. Suitable GFCI circuits, including, for example, GFCI boards equipped or not equipped with an arc fault circuit interrupter (AFCI) circuit, include, but are not limited to, those described in U.S. Patent Application Publication No. 2022/0337049, incorporated herein by reference in its entirety. Suitable low-voltage interfaces can include, but are not limited to, conventional USB devices as well as GaN USB devices described in co-pending patent application Ser. No. 17/836,701, incorporated herein by reference in its entirety.

During assembly the compliant pins can be inserted into one or more of the outer circuit boards as required. The one or more outer boards can then be mated with one or more inner boards and the other one or more outer boards. The compliant pins can form a mechanical and electrical connection. This reduces the complexity of the outlet, reduces the assembly time, and allows for a slimmer outlet design.

The foregoing detailed description of the certain exemplary configurations and implementations has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present disclosure, and are not intended to limit the structure of the exemplary embodiments of the present disclosure to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments. Unless specified or limited otherwise, the terms “mounted,” “connected,” “supported,” and “coupled” and variations thereof are used broadly and encompass both direct and indirect mountings, connections, supports, and couplings.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Certain electrical components are generally shown and described in terms of their functions or end results as it would be understood by one of ordinary skill viewing this disclosure that the exact structure, connections, and components can be varied to achieve the desired results. In addition, certain implementation may include hardware, software, and electronic components or modules that, for purposes of discussion, may be illustrated and described as if most of the components were implemented solely in hardware. However, one of ordinary skill in the art, and based on a reading of this disclosure would recognize that in certain configurations the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

What is claimed:

1. An electrical outlet comprising:
- a housing having a faceplate with a first opening in communication with a high-voltage interface and a second opening in communication with a low-voltage interface;
- a power supply circuit board having a power conversion circuit positioned in the housing;
- a protection circuit board having a circuit interrupting device positioned in the housing;
- a low-voltage circuit board including the low-voltage interface; and
- a compliant pin electrically connecting the power conversion circuit and the low-voltage interface,
- wherein the compliant pin includes a head configured to provide press-fit, solderless connection, and
- wherein the protection circuit board is positioned between the power supply circuit board and the low-voltage circuit board.

2. The electrical outlet of claim 1, wherein the low-voltage interface is a universal serial bus interface.

3. The electrical outlet of claim 1, wherein the compliant pin extends through the protection circuit board.

4. The electrical outlet of claim 1, wherein the compliant pin mechanically and electrically connects the low-voltage circuit board and the power supply circuit board.

5. The electrical outlet of claim 1, wherein the protection circuit board includes a first pin port and a second pin port, and wherein the compliant pin extends between from the power supply circuit board and engages the first pin port and a second compliant pin extends from the low-voltage circuit board and engages the second pin port.

6. The electrical outlet of claim 5, wherein the first pin port is aligned with the second pin port.

7. The electrical outlet of claim 5, wherein the first pin port is offset from the second pin port.

8. The electrical outlet of claim 1, wherein the circuit interrupting device is a ground fault circuit interrupter.

9. An electrical outlet comprising:
- a housing having a faceplate with a first opening in communication with a high-voltage interface and a second opening in communication with a low-voltage interface;
- a protection circuit board having a circuit interrupting device;
- a high-voltage input electrically connected to the protection circuit board;
- a power supply circuit board electrically connected to the high-voltage input and configured to convert a high-voltage source to a low-voltage power supply;
- a low-voltage circuit board in communication with the low-voltage interface, the low-voltage circuit board receiving the low-voltage power supply from the power supply circuit board; and
- a plurality of compliant pins connecting the low-voltage circuit board and the power supply circuit board, wherein each of the plurality of compliant pins includes a head configured to provide press-fit, solderless connection.

10. The electrical outlet of claim 9, wherein the protection circuit board includes a plurality of pass-through openings and wherein each of the plurality of pass-through openings receives a respective compliant pin.

11. The electrical outlet of claim 9, wherein the circuit interrupting device is a ground fault circuit interrupter and wherein the plurality of compliant pins are electrically isolated from the ground fault circuit interrupter.

12. The electrical outlet of claim 9, wherein the plurality of compliant pins includes a first set of pins extending from the low-voltage circuit board to the protection circuit board and a second set of pins extending from the power supply circuit board to the protection circuit board.

13. The electrical outlet of claim 12, wherein the first set of pins mechanically and electrically engages the low-voltage circuit board to the protection circuit board and the second set of pins mechanically and electrically engages the power supply circuit board to the protection circuit board.

14. The electrical outlet of claim 12, wherein the protection circuit board includes a plurality of pin ports and wherein each of the pin ports receives a respective compliant pin.

15. The electrical outlet of claim 14, wherein the plurality of pin ports receiving the first set of pins are aligned with respective pin ports receiving the second set of pins.

16. The electrical outlet of claim 14, wherein the pin ports receiving the first set of pins are offset from the pin ports receiving the second set of pins.

17. A method for assembling an electrical receptacle, the method comprising:
- stacking first, second and third boards such that the second board is arranged between the first board and the third board, the second board including a ground fault circuit interrupter (GFCI) circuit, the third board including a low-voltage interface, and the first board including a power conversion device, wherein the stacking includes connecting at least one compliant pin between two of the first, second, and third boards, which connecting includes making a press-fit, solderless connection with the at least one compliant pin and establishes an electrical connection between the power conversion device and the low-voltage interface to power the low-voltage interface.

18. The method claimed in claim 17, wherein the low-voltage interface is a universal serial bus interface.

19. The method claimed in claim 17, wherein the at least one compliant pin extends from the first board, through the second board, and to the third board to power the low-voltage interface.

20. The method claimed in claim 17, wherein the at least one compliant pin includes a first compliant pin and a second compliant pin, wherein the first compliant pin extends from the first board to the second board and mechanically mates the first and second boards, wherein the second compliant pin extends from the second board to the third board and mechanically mates the second and third boards.

* * * * *